United States Patent
Lu et al.

(10) Patent No.: US 11,263,083 B1
(45) Date of Patent: Mar. 1, 2022

(54) METHOD AND APPARATUS FOR SELECTIVE BOOT-UP IN COMPUTING DEVICES

(71) Applicant: Quanta Computer Inc., Taoyuan (TW)

(72) Inventors: Po-Yen Lu, Taoyuan (TW); Wei-Tsung Tu, Taoyuan (TW); Yu-Kai Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/214,614

(22) Filed: Mar. 26, 2021

(51) Int. Cl.
*G06F 11/07* (2006.01)
*G06F 11/14* (2006.01)

(52) U.S. Cl.
CPC ........ *G06F 11/1417* (2013.01); *G06F 11/079* (2013.01); *G06F 11/0772* (2013.01); *G06F 11/0787* (2013.01); *G06F 11/1471* (2013.01)

(58) Field of Classification Search
CPC ............. G06F 11/1417; G06F 11/0772; G06F 11/0787; G06F 11/1471; G06F 11/079
See application file for complete search history.

(56) References Cited

U.S. PATENT DOCUMENTS

| | | | |
|---|---|---|---|
| 2012/0311310 A1* | 12/2012 | Lin ...................... | G06F 11/0757 713/1 |
| 2019/0317774 A1* | 10/2019 | Raghav ................. | G06F 9/4406 |
| 2020/0089572 A1* | 3/2020 | Bodner ................. | G06F 11/366 |
| 2020/0218545 A1* | 7/2020 | Ganesan ............. | G06F 11/1433 |

* cited by examiner

*Primary Examiner* — Matthew M Kim
*Assistant Examiner* — Kyle Emanuele
(74) *Attorney, Agent, or Firm* — Nixon Peabody LLP (57) ABSTRACT

A system and method for to modify a setup to allow a restart despite a faulty hardware component is disclosed. The system includes a management controller storing a system error log. The computer system includes hardware components in communication with the management controller. A basic input output system (BIOS) includes a start-up routine that successfully completes if all of the hardware components are functional. The start-up routine determines an error in one of the hardware components from the system error log. The routine disables the hardware component. The routine then completes a power-on self-test routine.

15 Claims, 4 Drawing Sheets

METHOD AND APPARATUS FOR SELECTIVE BOOT-UP IN COMPUTING DEVICES

TECHNICAL FIELD

The present disclosure relates generally to routines for increasing operational reliability in computer systems. More particularly, aspects of this disclosure relate to a routine that disables faulty components on boot up instead of shutting down a computer system for troubleshooting.

BACKGROUND

Servers are employed in large numbers for high demand applications, such as network-based systems or data centers. The emergence of cloud computing applications has increased the demand for data centers. Data centers have numerous servers that store data and run applications accessed by remotely-connected computer device users. A typical data center has physical rack structures with attendant power and communication connections. Each rack may hold multiple computing servers and storage servers. Each server generally includes hardware components such as processors, memory devices, network interface cards, power supplies, and other specialized hardware. Each of the servers generally includes a baseboard management controller (BMC) that manages the operation of the server, as well as communicates operational data to a central management station that manages the servers of the rack. The BMC relieves the need for the Central Processing Unit (CPU) of the server to monitor server operations. As with all computer systems, servers have a basic input/output system (BIOS) that is typically a flash memory chip. The BIOS is executed to test basic inputs and outputs to components of the server before booting up the server.

A computer system may crash when encountering errors in its memory, CPU, peripheral devices, or other components of the system. After a crash, such error issues must be analyzed to determine a possible broken or faulty component, and thus allow the broken component to be replaced. This process is often time-consuming and tedious for computer system operators. For example, a computer system may accidentally crash due to a catastrophic error (CATERR) event from the CPU. If the faulty CPU is still present in the computer system, the computer system cannot power on when subsequent power-ups are attempted. The computer system, thus, is not capable of booting normally. Traditionally, technicians will power off the computer system, perform debug procedures, and replace the faulty CPU onsite at the data center. However, this process results in costly downtime as the server is not functional during this period.

Another way to solve certain catastrophic errors is providing an update to the BIOS to facilitate the debug process. In this instance, a technician will power off the computer system and use a supported BMC to update a debug BIOS for debugging purposes. In this case, if the BMC does not support updates to the BIOS, the computer system still cannot boot into the operating system (OS). The only way to update the BIOS for the debug function is by swapping a debug BIOS with the existing BIOS chip. This technique is unsuitable for remote solutions, such as those required for a data center, because technicians must perform the change of the BIOS chip on site. Although this solution is workable, it is also inconvenient and time-consuming.

Figure 1:
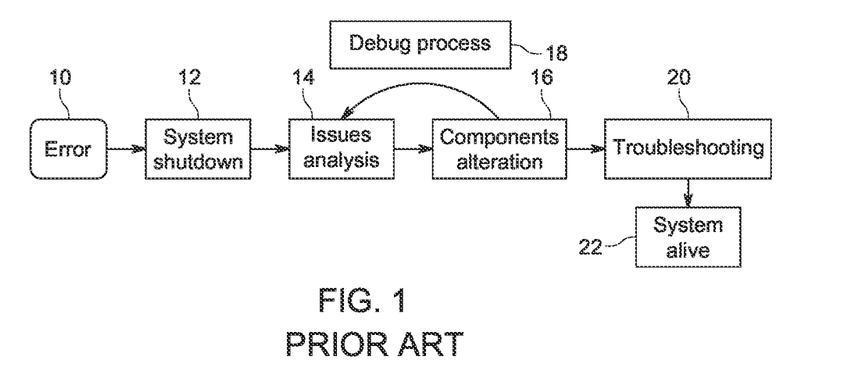
FIG. 1 is a flow diagram of a prior art routine for shutting down a computer system for trouble shooting purposes.

FIG. 1 is a flow diagram of the process of a known shutdown of a computer system that is initiated to allow technicians to troubleshoot the computer system. This process is triggered when an error occurs in a hardware component, such as a CPU, memory, or a peripheral device (10). During the POST routine, the computer system detects the error and shuts down the computer system (12). A technician then must perform an analysis of the potential sources of the error (14). The technician then addresses the likely faulty component by either repairing or replacing it (16). This cycle is repeated to attempt to debug the system (18). Once the likely faulty component is repaired, the troubleshooting process is completed (20). The system then may be restarted successfully (22). However, this process from the system shutdown phase 12 to the troubleshooting phase 20 is time-consuming and results in downtime for the serer.

Thus, there is a need for a BIOS for computer systems that allows system operation by disabling components automatically that prevent power-up. There is a further need for a routine that avoids the necessity to update the BIOS to perform a debug process.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a computer system avoiding shut down from a malfunctioning component. The system includes a management controller storing a system error log. The system includes a plurality of hardware components, each in communication with the management controller. The system includes a basic input output system (BIOS) including a start-up routine configured to successfully complete when all of the plurality of hardware components are functional. The BIOS is operable to determine an error logged from one of the plurality of hardware components in the system error log. The BIOS disables the hardware component corresponding to the logged error. The BIOS modifies the start-up routine to avoid the disabled hardware component. The BIOS then completes a power-on self-test routine.

A further implementation of the example computer system is an embodiment where the management controller is a baseboard management controller. Another implementation is where the computer system is a server. Another implementation is where the hardware components includes at least one of a processor, a memory device, a storage device, and an expansion card. Another implementation is where the BIOS includes a non-volatile random access memory (NVRAM) configured to store a command to disable the hardware component. Another implementation is where the management controller saves an image of the BIOS including the plurality of hardware components prior to the disabling of the hardware component. Another implementation is where the management controller is configured to detect a chassis open event. The management controller is configured to load the saved BIOS image when the chassis open event is detected. Another implementation is where the saved BIOS image is used for the start-up routine. Another implementation is where the management controller sends a signal on general purpose input output (GPIO) pin to activate the BIOS to disable the hardware component.

Another disclosed example is a method of starting a computer system having a plurality of hardware components. An error logged from at least one of the plurality of hardware components is determined by analyzing a system error log of a management controller via a start-up routine of a basic input output system (BIOS). The hardware component corresponding to the logged error is disabled. The start-up routine is modified to avoid the disabled hardware component. A power-on self-test routine is completed.

Another implementation of the example method is where the management controller is a baseboard management controller, and the computing device is a server. Another implementation is where the computer system is a server. Another implementation is where the hardware components includes at least one of a processor, a memory device, a storage device, and an expansion card. Another implementation is where the BIOS includes a non-volatile random access memory (NVRAM) configured to store a command to disable the hardware component. Another implementation is where the method further includes saving an image of the BIOS including the plurality of hardware components via the management controller prior to disabling the hardware component. Another implementation is where the method includes detecting a chassis open event. The saved BIOS image is loaded when the chassis open event is detected. Another implementation is where the saved BIOS image is used for the start-up routine. Another implementation is where the management controller sends a signal on general purpose input output (GPIO) pin to activate the BIOS to disable the hardware component.

Another disclosed example is a computer server having a processor; a series of dual in line memory modules; and an expansion card. A baseboard management controller is coupled to the processor, dual in line memory modules, and expansion card. The baseboard management controller stores a system error log having an error logged for at least one of the processor, memory modules or expansion card. A basic input output system (BIOS) includes a start-up routine that successfully completes when all of the plurality of hardware components are functional. The BIOS determines an error logged from one of processor, dual in line memory modules, and expansion card in the system error log. The BIOS disables the processor, dual in line memory modules, or expansion card corresponding to the logged error. The BIOS modifies the start-up routine to avoid the disabled processor, dual in line memory module, or expansion card. The BIOS completes a power-on self-test routine.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a routine that allows a computer system to power on successfully even if one or more hardware components are not functioning correctly. During start up, when the example routine system encounters an error in memory devices, PCIe devices, or the CPU, the computer system will avoid crashing. The routine disables the malfunctioning hardware components by remote control on the computer system. This allows the computer system, such as remote server, to power on automatically and successfully without intervention from a data center operator.

Figure 2:
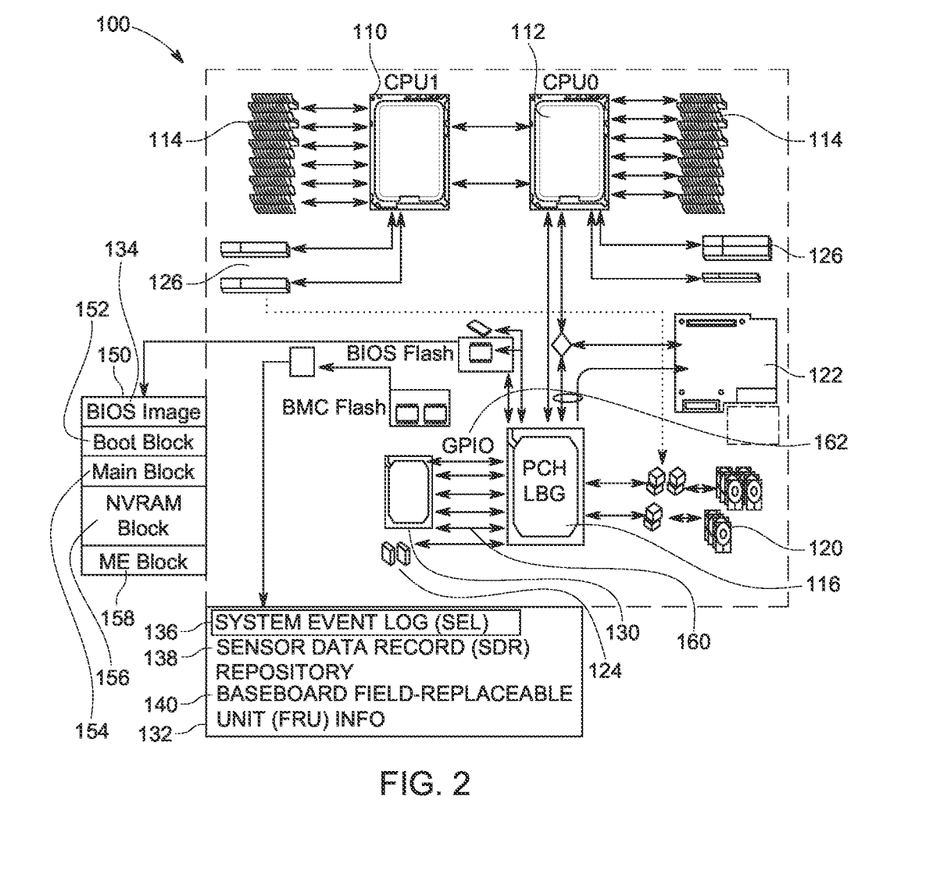
FIG. 2 is a block diagram of an example computer system having a routine that allows for disabling components rather than shutting down the system.

FIG. 2 is a block diagram of the components of a computer system 100 that runs a routine that allows the computer system 100 to be powered up despite having a faulty hardware component. In this example, the computer system 100 is a server, but any suitable computer device can incorporate the principles disclosed herein. The computer system 100 has two central processing units (CPU) 110 and 112. The two CPUs 110 and 112 have access to dual in line memory modules (DIMM)s 114. Although only two CPUs are shown, additional CPUs may be supported by the computer system 100. Specialized functions may be performed by specialized processors such as a GPU or a field programmable gate array (FPGA) mounted on a motherboard or on an expansion card in the computer system 100.

A platform controller hub (PCH) 116 facilitates communication between the CPUs 110 and 112 and other hardware components such as serial advanced technology attachment (SATA) devices 120, Open Compute Project (OCP) devices 122, and USB devices 124. The SATA devices 120 may include hard disk drives (HDD)s. Alternatively, other memory storage devices such as solid state drives (SSD)s may be used. Other hardware components such as PCIe devices 126 may be directly accessed by the CPUs 110 or 112 through expansion slots (not shown). The additional PCIe devices 126 may include network interface cards (NIC), redundant array of inexpensive disks (RAID) cards, field programmable gate array (FPGA) cards, and processor cards such as graphic processing unit (GPU) cards.

The hardware components of the computer system 100 must be functional when examined by a start-up routine in the basic input output system (BIOS) for the computer system 100 to successfully boot-up. Thus, the BIOS initialize and trains memory devices and PCIe devices 126. The BIOS also allocates the resources required for the PCIe devices 126. Crashes may occur during the operation of the BIOS for initialization, training or resource allocation of each of the hardware components. Alternatively, is fatal and uncorrectable error may cause a system crash directly. Additional hardware components may also be functional for the BIOS to successfully boot-up the computer system 100.

A baseboard management controller (BMC) 130 manages operations such as power management and thermal management for the computer system 100. The BMC 130 has access to a dedicated BMC memory device 132 that may be a flash memory device. A separate basic input output system (BIOS) memory device 134 is a non-volatile memory such as flash memory BIOS firmware. The memory device 134 may be a BIOS chip. Both the memory devices 132 and 134 may be accessed through the PCH 116.

In this example, the BMC memory device 132 stores a system event log (SEL) 136, a sensor data record 138, and BMC field replacement unit (FRU) information record 140. The BIOS memory device 134 may include a BIOS image 150, a boot block 152, a main block 154, a non-volatile random access memory (NVRAM) block 156 for storing BIOS configuration data, and a management engine (ME) block 158. The blocks in the BIOS memory 134 facilitate the start-up routine for the computer system 100.

In this example, the BMC 130 communicates with the PCH 116 through different channels 160 that may include SMbus, LPC, PCIe, and USB lines. The PCH 116 includes a series of general purpose input/output pins (GPIO) 162 for communicating with the BMC 130 and the BIOS memory device 134. The BMC 130 includes firmware that receives error message from hardware components in the computer system 100. The error messages are stored in the system error log 136.

The BIOS 134 includes an example routine that determines faulty hardware components and disables the faulty hardware component. The example routine therefore allows the computer system 100 to operate until the faulty hardware component is replaced or repaired. When a hardware component fails, the BMC 130 will have the information relating to the faulty component recorded in the system error log (SEL) 136. During a subsequent power on, the SEL 136 will have information on the faulty hardware component and the BMC 130 will send the information about the faulty component to the BIOS 134 to disable the faulty hardware component.

Figure 3:
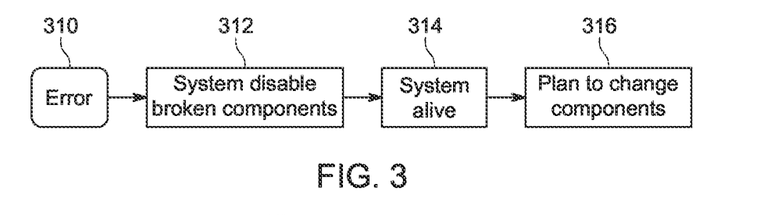
FIG. 3 is a flow diagram of the general process of keeping the example computer system in FIG. 2 alive while performing error analysis.

FIG. 3 shows a flow diagram of the general process to keep the computer system 100 in FIG. 2 active even if a hardware component is faulty. An error occurs in one of the hardware components (310). The example routine then disables the faulty hardware component (312). The computer system 100 may then be started (314). The user is then alerted about the faulty hardware component, allowing the faulty hardware component to be repaired or replaced at a future time, while the computer system 100 still operates until the repair or replacement (316).

Figure 4:
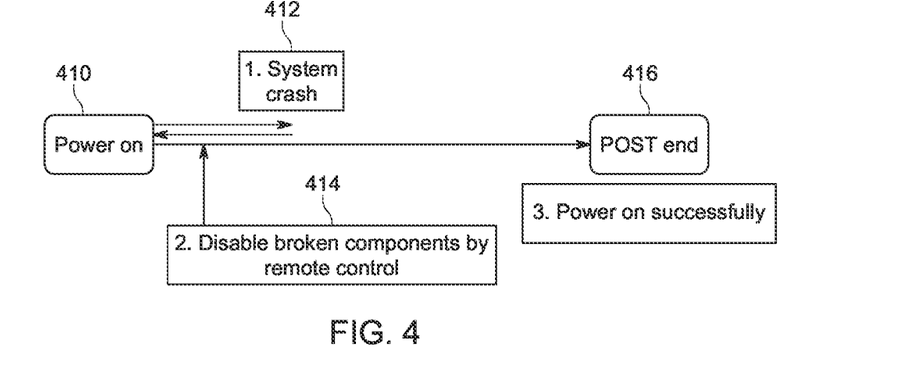
FIG. 4 is a flow diagram of the process of the start-up routine that disables components in the computer system in FIG. 2 after a system crash.

FIG. 4 shows a flow diagram of the example routine that allows the computer system 100 to complete the power-on self-test (POST) routine even if a hardware component, such as the SATA devices, PCIe devices, DIMMs, or the CPUs are faulty. The power is first turned on (410). Due to the faulty component, the computer system 100 crashes on executing the POST routine (412). The computer system 100 may then be restarted (410). On the restart from the system crash, the example routine disables the faulty hardware components (414). Since the faulty hardware component is disabled, the POST routine may be successfully completed (416) without requiring technicians to physically replace the broken component.

The example routine allows recovery of a computer system 100 to boot up properly by disabling a faulty hardware component such as a damaged CPU, memory or PCIe add-on card. This allows a subsequent successful start-up of the computer system 100 and obviates the current need to physically remove or replace the faulty hardware component. The example routine has three parts, classification of a faulty hardware component, recovery of the computer system by disabling faulty hardware components, and the BMC 130 informing the BIOS 134 to prevent access to any faulty hardware components. The BIOS 134 may then successfully power-on the computer system 100 and complete the POST routine.

Detection of the faulty hardware component relies on classification in the system error log 136 managed by the BMC 130. For example, processor damage usually causes a processor internal error (IERR) or catastrophic error (CATERR) to be logged, while memory damage causes uncorrectable error, training failure or MCA errors to be logged.

The recovery of the computer system 100 during a subsequent power-up routine is accomplished by disabling any faulty hardware components detected during the startup. Different hardware components require different disabling procedures specific to the type of hardware component. For example, if a core of a CPU is faulty, the faulty core or cores in the CPU is disabled by sending a core disable bitmap in hex characters from the BIOS 134. Such a bitmap may be provided where each bit represents one of the cores in a CPU. For example, if a CPU has eight cores, the bitmap of the eight cores will indicate which of the cores are faulty. As will be explained, the BMC 130 sends an OEM IPMI command to the BIOS 134 to disable the faulty core identified in the bitmap. Thus in a system with multiple CPUs, each having multiple cores, a corresponding bitmap for each CPU may be provided and individual faulty cores may be identified. A memory device may be disabled by providing the socket and channel data to enable a bit in a bitmask in hex characters representing to faulty memory device. For example, a CPU may have multiple channels. Each channel allows the CPU to access multiple DIMMs. The individual DIMM has a series of ranks. The bitmask may be set to indicate the faulty memory device by channel and rank. As will be explained, the BMC 130 sends an OEM IPMI command to the BIOS 134 to disable the faulty memory device identified in the bitmask. Expansion cards such as those in expansion slots for the PCIe devices 126 may be disabled by disabling the PCIe root port.

The BMC 130 filters the corresponding faulty hardware components based on the information in the SEL 136. The BMC 130 may send a signal via the GPIO pin 162 to inform the BIOS 134 not to use the faulty hardware component and to disable the faulty hardware component.

Figure 5:
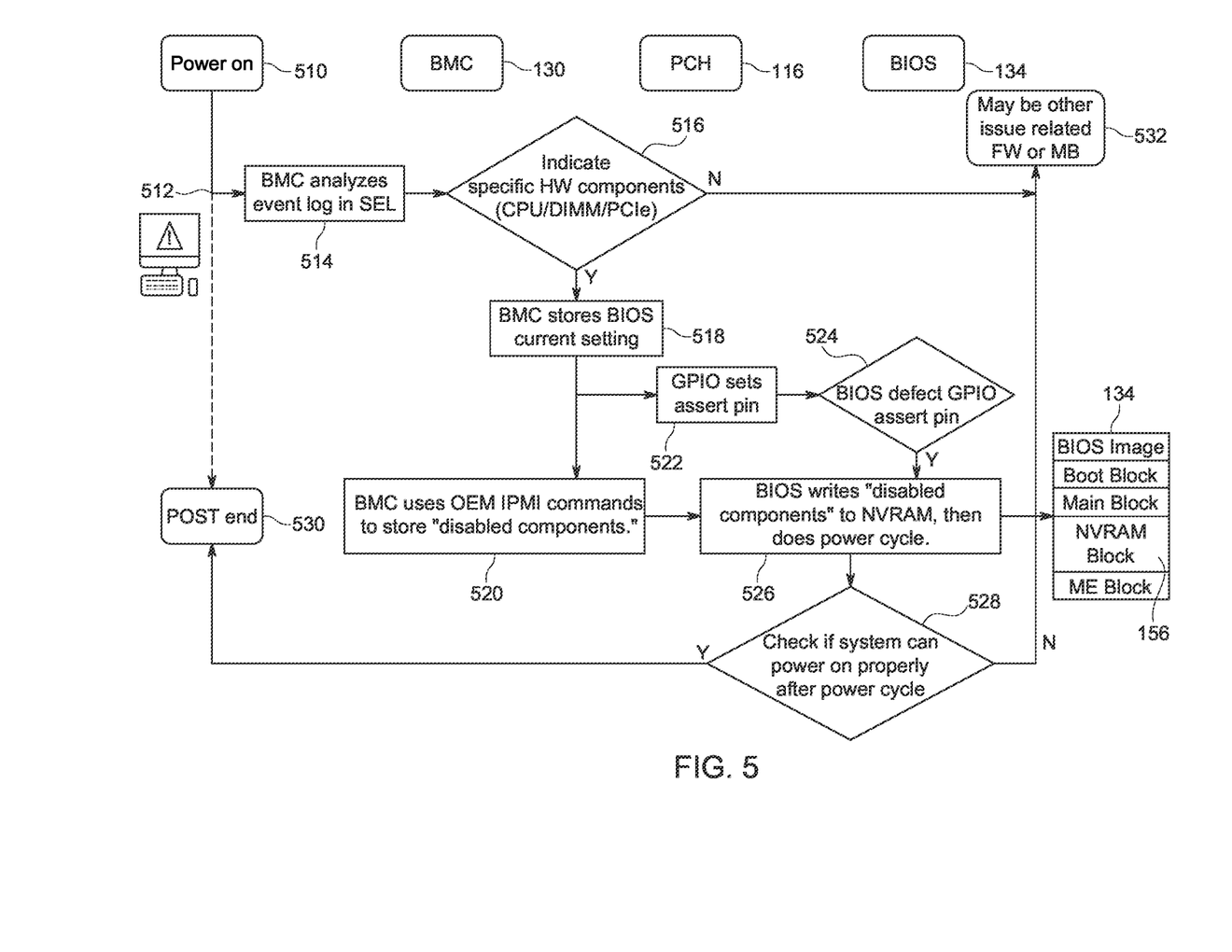
FIG. 5 is a flow diagram of the process to disable components to allow the successful execution of a POST routine.

FIG. 5 shows a flow diagram 500 of the example start-up routine that may identify and avoid faulty hardware components by interactions through the BMC 130, the PCH 116, and the BIOS memory device 134 in FIG. 2. The computer system 100 in FIG. 2 is powered-on (510). The routine encounters a situation where the computer system 100 cannot power-up properly such as a faulty hardware component during BIOS operation or a catastrophic error (512). The routine then checks if the system event log 136 indicates an error from a faulty hardware component (514). The routine determines whether the system event log 136 specifically indicates at least one faulty hardware component through a logged error (516). For example, the logged errors may include IERR/CATERR for a CPU, a MCE error or memory training failed for a memory device, or a PCIe out-of-resource error for a PCIe device.

If a broken component is found (516), the BMC 130 stores the current BIOS settings in the BMC self-storage constituting the BMC memory device 132 (518). The BMC 130 then uses OEM IPMI remote commands to send data relating to broken component to the BIOS 134 (520). The stored remote command includes the appropriate data for the faulty hardware components such as CPU, DIMM, or add-on card. The BMC 130 also sets the GPIO pin 162 to send an assert signal to the PCH 116 (522). The BIOS memory device 134 detects the GPIO assert signal from the PCH 116 (524). The BIOS memory device 134 then writes the data of the faulty hardware components from the BMC 130 to the NVRAM block 156 of the BIOS memory device 134 (526). The routine then initiates the power cycle with the POST routine with the modified BIOS that disables the faulty hardware component based on the stored data in the NVRAM block 156. The routine then checks whether the computer system 100 can power-on properly after the power cycle (528). If the power-on routine is successful, the routine reaches the end of the POST routine (530). If the power-on is not properly performed (528) or the BMC 130 cannot find the specific faulty hardware component (516), the system will refer to other issues related to the firmware, the motherboard, or unknown issues as the cause of the crash (532).

When technicians open the chassis of the computer system 100 and replace faulty hardware components, the BMC 130 may use a chassis-open event in the SEL 136 to check the computer system 100. In this example, the computer system 100 will switch from the modified BIOS settings that disable the faulty hardware component in the NVRAM 156 block to the original saved BIOS settings to restart the computer system 100 normally.

The example system 100 also has a retry mechanism. Thus, if the example routine disables some faulty hardware components, the retry mechanism will attempt to power-on several times. If a retry fails several times, the computer system 100 will refer to other issues related to firmware, the motherboard or unknown issues as the cause of the crash.

Figure 6:
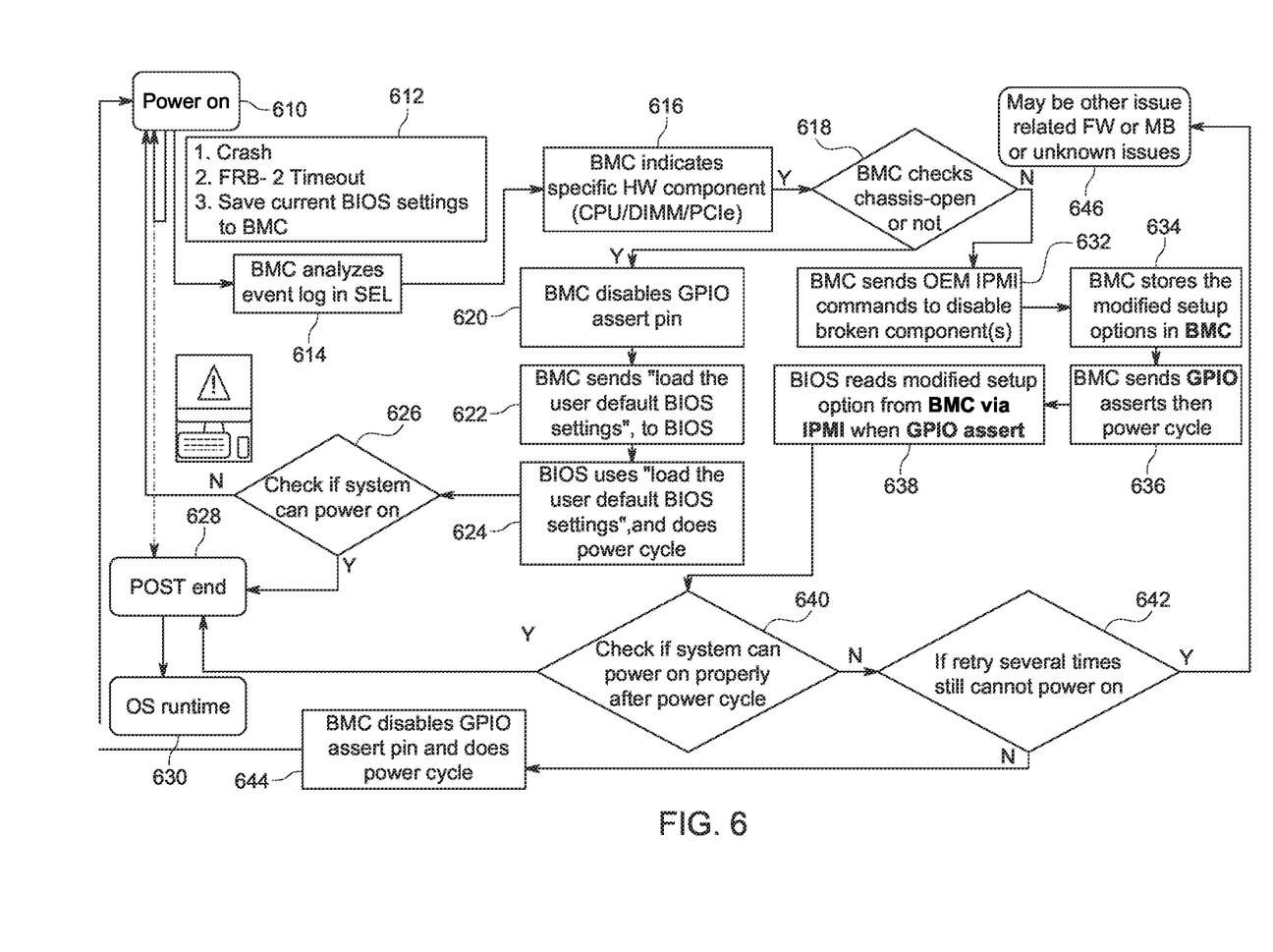
FIG. 6 is a flow diagram of the process to restart a computer system to allow either disabling of components or the replacement of components.

FIG. 6 is an example of a routine 600 for an alternative example routine that allows the start-up of the computer system 100 accounting for a chassis open condition where a technician replaces components, as well as the retry mechanism. The computer system 100 in FIG. 2 is initially powered-on (610). The routine encounters a situation where the computer system 100 cannot power-up properly and crashes (612). When the crash occurs, a fault resilient booting 2 (FRB-2) time out occurs, and the current BIOS settings are saved to the BMC 130. In this example, the current BIOS settings are user defined default BIOS settings. Typically, the modified options for a BIOS are saved in NVRAM. When the computer system 100 performs an AC or DC power cycle, the BIOS setup menu options are still saved. When a debug process such as flashing a new BIOS chip occurs, the BIOS settings will roll back to the original settings requiring a user to provide the previously modified BIOS setup options. In this example, the modified BIOS setup options are saved as user defined default BIOS settings.

On the restart (610), the routine analyzes the system event log 136 to determine any errors from a faulty hardware component (614). The routine determines whether the information log 136 indicates at least one faulty hardware component (616). The BMC 130 then determines whether the chassis of the computer system 100 has been opened (618). The open chassis then indicates that a technician has replaced the faulty hardware component. If the chassis has been opened (618), the BMC 130 disables the GPIO pin 162 (620). The BMC 130 sends a load user default BIOS setting command to the BIOS 134 (622). The BIOS memory device 134 will use the loaded user default BIOS settings from the BMC 130 to perform the power cycle routine (624). In this manner, the user default BIOS settings are saved and loaded, avoiding the requirement for a user to set up the BIOS in previous systems. The saving of the user default BIOS settings can thus avoid a tedious procedure in a data center, if a user has changed a large number of BIOS setup options.

The routine then determines whether the computer system 100 can power-on (626). If the computer system 100 powers on successfully, the POST routine ends (628). The operating system may then be run (630). If the computer system 100 cannot be powered-on, the routine cycles back to the power-on (610).

If the chassis has not been opened, the BMC 130 sends an OEM IPMI remote command to send the data of the corresponding faulty hardware component (632). The BMC 130 stores the data of the faulty hardware component in the BMC memory device 132 (634). The BMC 130 also sets one of the GPIO outputs to send an assert signal (636). The BIOS memory device 134 reads the data of the faulty hardware component from the BMC 130 when the GPIO assert signal is received (638). The routine then initiates the power cycle with the POST routine with the modified BIOS that disables the faulty hardware component based on a modified setup option that incorporates the data for the faulty hardware component. The routine then checks whether the computer system 100 can power-on properly after the power cycle (640). If the power-on routine is successful, the routine reaches the end of the POST routine (630).

If the power-on is not properly performed (640), the computer system 100 will retry several times to attempt a proper power-on cycle (642). If one of the power cycles is successful, the BMC 130 disables the GPIO pin 162 and performs the power cycle routine (644). If the retries do not result in a power-on, the computer system 100 will refer to other issues related to firmware, the motherboard, or unknown issues as the cause of the crash (646).

The flow diagrams in FIGS. 5-6 are representative of example machine-readable instructions for allowing successfully completion of the POST routine despite a faulty hardware component in the computer system 100 in FIG. 2. In this example, the machine-readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces can be implemented by software, hardware, and/or firmware. Also, some or all of the machine-readable instructions represented by the flowcharts may be implemented manually. Further, although the example algorithm is described with reference to the flowcharts illustrated in FIGS. 5-6, persons of ordinary skill in the art will readily appreciate that many other methods of implementing the example machine-readable instructions may alternatively be used. For example, the order of execution of the blocks may be changed, and/or some of the blocks described may be changed, eliminated, or combined.

The disclosed principles can avoid the tedious procedures to immediately replace hardware components to avoid computer system downtime. The example routine allows the computer system to operate without reduced performance, and also provides technicians with remote debugging information.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A computer system avoiding shutdown from a malfunctioning component, the computer system comprising:
   a management controller storing a system error log;
   a plurality of hardware components, each hardware component in communication with the management controller;
   a basic input output system (BIOS) including a start-up routine configured to successfully complete when all of the plurality of hardware components are functional, the BIOS operable to:
      determine an error logged from one of the plurality of hardware components in the system error log from previously executing a start-up routine;
      disable the hardware component corresponding to the logged error;
      modify the start-up routine to avoid use of the disabled hardware component; and
      subsequently executing the modified start-up routine to complete a power-on self-test routine; and
   wherein the management controller is configured to save an image of the BIOS including the plurality of hardware components before the hardware component is disabled, detect a chassis open event, and load the saved BIOS image when the chassis open event is detected.

2. The system of claim 1, wherein the management controller is a baseboard management controller.

3. The system of claim 1, wherein the computer system is a server.

4. The system of claim 1, wherein the plurality of hardware components includes at least one of: a processor, a memory device, a storage device, and an expansion card.

5. The system of claim 1, wherein the BIOS includes a non-volatile random access memory (NVRAM) configured to store a command to disable the hardware component.

6. The system of claim 1, wherein the saved BIOS image is used for the start-up routine.

7. The system of claim 1, wherein the management controller sends a signal to a general purpose input output (GPIO) pin to activate the BIOS to disable the hardware component.

8. A method of operating starting a computer system having a plurality of hardware components, the method comprising:
   determining an error logged from at least one of the plurality of hardware components by analyzing a system error log of a management controller via executing a start-up routine of a basic input output system (BIOS);
   disabling the hardware component corresponding to the logged error;
   saving an image of the BIOS including the plurality of hardware components via the management controller prior to disabling the hardware component;
   modifying the start-up routine to avoid use of the disabled hardware component;
   completing a power-on self-test routine via subsequently executing the modified start-up routine;
   detecting a chassis open event; and
   loading the saved BIOS image when the chassis open event is detected.

9. The method of claim 8, wherein the management controller is a baseboard management controller.

10. The method of claim 8, wherein the computer system is a server.

11. The method of claim 8, wherein the plurality of hardware components includes at least one of: a processor, a memory device, a storage device, and an expansion card.

12. The method of claim 8, wherein the BIOS includes a non-volatile random access memory (NVRAM) configured to store a command to disable the hardware component.

13. The method of claim 8, wherein the saved BIOS image is used for the start-up routine.

14. The method of claim 8, wherein the management controller sends a signal on a general purpose input output (GPIO) to activate the BIOS to disable the hardware component.

15. A computer server comprising:
   a processor;
   a series of dual in line memory modules;
   an expansion card;
   a baseboard management controller coupled to the processor, the dual in line memory modules, and the expansion card, the baseboard management controller configured to:
      store a system error log having an error logged for at least one of the processor, memory modules or expansion card;
      save an image of the BIOS including the plurality of hardware components before the hardware component is disabled;
      detect a chassis open event; and
      load the saved BIOS image when the chassis open event is detected;
   a basic input output system (BIOS) including a start-up routine that successfully completes when all of the plurality of hardware components are functional, the BIOS operable to:
      determine an error logged from one of: the processor, the dual in line memory modules, and the expansion card in the system error log;
      disable the processor, dual in line memory modules, or expansion card corresponding to the logged error;
      modify the start-up routine to avoid the disabled processor, dual in line memory module, or expansion card; and
   complete a power-on self-test routine.

* * * * *